US012508943B2

United States Patent
Vitale

(10) Patent No.: US 12,508,943 B2
(45) Date of Patent: Dec. 30, 2025

(54) SYSTEMS AND METHODS FOR QUEUE MANAGEMENT OF MACHINES BASED ON BATTERY-RELATED CHARACTERISTICS

(71) Applicant: Caterpillar Inc., Peoria, IL (US)

(72) Inventor: Andrew J. Vitale, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 349 days.

(21) Appl. No.: 17/569,511

(22) Filed: Jan. 6, 2022

(65) Prior Publication Data

US 2023/0211698 A1 Jul. 6, 2023

(51) Int. Cl.
*B60L 58/12* (2019.01)
*B60L 53/68* (2019.01)
*B60L 58/18* (2019.01)
*G07C 5/00* (2006.01)

(52) U.S. Cl.
CPC ............... *B60L 58/12* (2019.02); *B60L 53/68* (2019.02); *B60L 58/18* (2019.02); *G07C 5/008* (2013.01); *B60L 2200/40* (2013.01)

(58) Field of Classification Search
None
See application file for complete search history.

(56) References Cited

U.S. PATENT DOCUMENTS

| 5,586,030 | A | 12/1996 | Kemner et al. |
| 5,931,875 | A | 8/1999 | Kemner et al. |
| 8,731,730 | B2 | 5/2014 | Watkins et al. |
| 8,930,043 | B2 | 1/2015 | Everett et al. |
| 8,983,707 | B2 | 3/2015 | Everett et al. |
| 9,142,978 | B2 | 9/2015 | Juhasz |
| 10,882,399 | B2 | 1/2021 | Koebler et al. |
| 11,001,161 | B2 | 5/2021 | Rosene et al. |
| 2011/0288769 | A1* | 11/2011 | Gudat ............... G01C 21/343 701/532 |
| 2012/0126754 | A1* | 5/2012 | Akahane ............. H02J 7/0013 320/137 |
| 2013/0119920 | A1 | 5/2013 | Hsu et al. |
| 2013/0179007 | A1* | 7/2013 | Dalum ............... H01M 10/48 701/2 |
| 2014/0232340 | A1* | 8/2014 | Jones ................. G06Q 10/06 320/109 |
| 2018/0060776 | A1 | 3/2018 | Ahmed et al. |
| 2020/0238847 | A1 | 7/2020 | Wiseman et al. |

(Continued)

OTHER PUBLICATIONS

Written Opinion and International Search Report for Int'l. Patent Appln. No. PCT/US2022/081726, mailed Dec. 16, 2022 (11 pgs).

*Primary Examiner* — James J Lee
*Assistant Examiner* — Melanie G Huber

(57) ABSTRACT

Systems and methods can position or provide a mobile machine in a queue of a plurality of the mobile machines such that an estimated future amount of energy of an energy source if the mobile machine is at or above a required amount of energy of the energy source to complete a predetermined task after the mobile machine reaches an end of the queue. Such positioning or providing can include or be moving the mobile machine up or forward in the queue from a condition where the estimated future amount of energy of the energy source is less than the required amount of energy of the energy source to complete the predetermined task after the mobile machine reaches the end of the queue.

16 Claims, 5 Drawing Sheets

(56) References Cited

U.S. PATENT DOCUMENTS

| | | |
|---|---|---|
| 2021/0010237 A1* | 1/2021 | Aizawa .................. E02F 3/439 |
| 2021/0065073 A1 | 3/2021 | Maeda et al. |
| 2021/0086651 A1 | 3/2021 | Maeda et al. |
| 2021/0291687 A1 | 9/2021 | Ferguson et al. |
| 2021/0291691 A1 | 9/2021 | Lu |
| 2021/0316713 A1* | 10/2021 | Vilar ......................... B60L 1/20 |
| 2021/0370794 A1* | 12/2021 | Dudar ................... B60L 53/126 |
| 2022/0001763 A1* | 1/2022 | Chadha .................. B60L 53/66 |
| 2022/0024330 A1* | 1/2022 | Books ..................... B60L 53/57 |
| 2022/0172129 A1* | 6/2022 | Hou ....................... G06Q 10/02 |
| 2022/0301044 A1* | 9/2022 | Löthman ............. G06F 16/9536 |

\* cited by examiner

SYSTEMS AND METHODS FOR QUEUE MANAGEMENT OF MACHINES BASED ON BATTERY-RELATED CHARACTERISTICS

TECHNICAL FIELD

The present disclosure relates generally to methods and systems for managing machines, and more particularly to systems and methods for queue management of machines based on battery-related characteristics.

BACKGROUND

Battery electric vehicles operating at a mine site, such as hauling vehicles, can have a limited battery capacity, and batteries may need to be managed to maintain a certain charge over the route. Often, the tasks associated with such machines may require sitting in a queue waiting for other trucks to be loaded, unloaded, or charged, and energy use while waiting may deplete charge that does not allow the machine to complete an assigned task or to drop battery charge below an optimal charge.

U.S. Pat. No. 11,001,161 ("the '161 patent") describes an electric vehicle charging scheduler. More specifically, the '161 patent describes that when a vehicle is detected to become less than a predefined distance from a charger a proposed charging schedule is calculated, and the vehicle joins a queue for the charger with the proposed charging schedule. According to the '161 patent the proposed charging schedule is calculated based on a current state-of-charge (SOC) and a desired SOC. However, the '161 patent may not describe taking into account post-charging tasks or future task planning.

SUMMARY

According to an aspect of the present disclosure, a method is described or can be implemented. The method can comprise: determining, using an electronic processor, an estimated amount of energy depletion of an energy source of a mobile machine at a worksite in order for the mobile machine to travel from a current location of the worksite and arrive at a predetermined location of the worksite at an end of a queue of a plurality of the mobile machines including said mobile machine and one or more additional mobile machines, said determining the estimated amount of energy depletion of the energy source being based on a current energy amount of the energy source at the current location, a predetermined route for said mobile machine to travel from the current location to the predetermined location at the end of the queue, a position of said mobile machine in the queue relative to the one or more additional mobile machines, and an estimated time for said mobile machine to travel from the current location of the worksite to the predetermined location of the worksite; comparing, using the electronic processor, an estimated future amount of energy of the energy source upon arrival of said mobile machine at the predetermined location, which is determined based on the estimated amount of energy depletion of the energy source, to a required amount of energy of the energy source to complete a predetermined task after said mobile machine arrives at the predetermined location of the worksite; and moving up in the queue, using the electronic processor, said mobile machine under a condition where the estimated future amount of energy of the energy source is less than the required amount of energy of the energy source to complete the predetermined task, such that the estimated future amount of energy of the energy source is at or above the required amount of energy of the energy source to complete the predetermined task.

According to another aspect of the present disclosure, a non-transitory computer-readable storage medium having stored thereon instructions that, when executed by one or more processors, causes the one or more processors to perform a method is described, can be provided, or may be implemented. The method can comprise: determining estimated charge loss of a battery of one of a plurality of battery electric machines for said one battery electric machine move from a current location of the worksite to arrive at a predetermined location of the worksite at an end of a queue of the battery electric machines comprised of the one battery electric machine and additional battery electric machines, the calculation of the estimated charge loss for the one battery electric machine to arrive at the predetermined location of the worksite being based on the current state of charge (SOC) of the battery of the one battery electric machine and estimated time for the one battery electric machine to move to the predetermined location via the queue, and outputting control signaling to position the one battery electric machine in the queue such that an estimated future state of charge, which is calculated based on the estimated charge loss of the battery, is at or above a required state of charge (SOC) to complete a predetermined task after the one battery electric machine arrives at the predetermined location of the worksite.

According to yet another aspect of the present disclosure a system for managing a plurality of battery electric vehicles (BEVs) at a worksite is disclosed or implemented. The system can comprise: circuitry to receive battery data sensed by respective battery sensors onboard the battery electric vehicles, the battery data including a current state of charge (SOC) of a battery of each of the battery electric vehicles; and processing circuity configured to calculate estimated charge loss of the battery of one of the battery electric vehicles for said one battery electric vehicle to arrive at a predetermined location of the worksite at an end of a queue of the battery electric vehicles comprised of said one battery electric vehicle and one or more additional battery electric vehicles of the plurality of battery electric vehicles, the calculation of the estimated charge loss for said one battery electric vehicle to arrive at a predetermined location of the worksite being based on the current state of charge (SOC) of the battery of said one battery electric vehicle, a planned route for said one battery electric vehicle to travel to the predetermined location at the end of the queue, and estimated time for said one battery electric vehicle to travel to the predetermined location via the queue, and provide said one battery electric vehicle in the queue such that an estimated future state of charge, which is calculated based on the estimated charge loss of the battery, is at or above a required state of charge (SOC) to complete a predetermined task after said one battery electric vehicle arrives at the predetermined location of the worksite.

DETAILED DESCRIPTION

The present disclosure relates generally to methods and systems for managing machines, and more particularly to systems and methods for queue management of machines based on battery-related characteristics.

Figure 1:
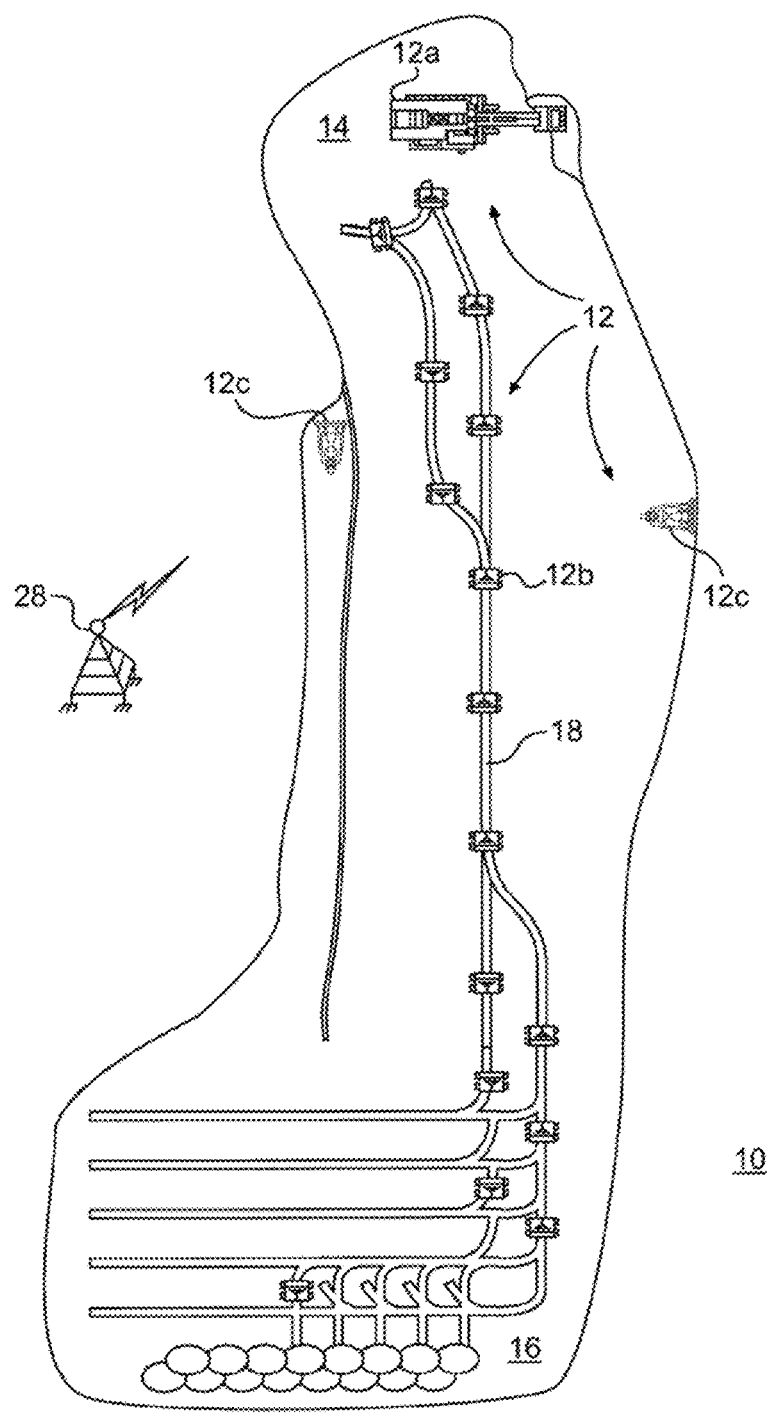
FIG. 1 is a representative illustration of a worksite in which systems and methods according to one or more embodiments of the disclosed subject matter can be implemented.

FIG. 1 illustrates an exemplary worksite 10 having multiple, simultaneously-operable machines 12 performing a variety of predetermined tasks. Worksite 10 may include, for example, a mine site, a landfill, a quarry, a construction site, or any other type of worksite known in the art. The predetermined tasks may be associated with altering the current geography at worksite 10 and include a clearing operation, a leveling operation, a hauling operation, a digging operation, a loading operation, or any other type of operation that functions to alter the current geography at worksite 10. Of course, embodiments of the disclosed subject matter are not limited to the specific configuration or worksite 10 shown in FIG. 1.

According to one or more embodiments, some or all of the machines 12 can be battery electric machines. Here, battery electric machines can mean or be defined as all-electric machines (e.g., battery electric vehicles (BEVs)) that use a battery or batteries exclusively to power the machine during travel or partially electric machines (e.g., hybrid electric vehicles (PHEVs or HEVs)) that use a battery or batteries at least part of the time to power the machine during travel. And some or all of the machines 12 can be fuel cell machines (e.g., fuel cell vehicles), according to one or more embodiments of the disclosed subject matter.

The machines 12 can be non-autonomous or autonomous or a mix of both non-autonomous and autonomous. Autonomous can mean fully autonomous or semi-autonomous. As used herein, a "fully autonomous" machine can be configured to traverse a travel path and/or perform various tasks or operations (e.g., lifting, dumping, paving, compacting paving material, etc.) without operator control or input. As used herein, a "semi-autonomous" machine can be configured to traverse a travel path and/or perform various tasks or operations upon receiving input and/or approval from an operator.

Worksite 10 may include multiple locations designated for particular purposes. For example, a first location 14 may be designated as a load location at which a mobile loading machine 12a or other resource operates to fill multiple mobile haul machines 12b with material. A second location 16 may be designated as a dump location at which mobile machines 12b discard their payloads. The first location 14 may be referred to herein as a predetermined location or a first predetermined location. The second location 16 may be referred to herein as a second or another predetermined location. The locations may be reversed, that is, the dump location may be the first predetermined location and the load location may be the second predetermined location, according to one or more embodiments of the disclosed subject matter, depending upon which predetermined location the mobile machines 12b are formed in a queue to reach. According to one or more embodiments, the first predetermined location, whether it be the load location or the dump location, may not be or include a fueling station (e.g., charging station) to refuel (e.g., recharge) the mobile machines 12b.

Though FIG. 1 shows mobile haul machines 12b and mobile loading machine 12a, embodiments of the disclosed subject matter are not limited to the types and/or numbers of mobile machines shown. As non-limiting examples, mobile machines according to embodiments of the disclosed subject matter may include digging machines, loading machines, hauling machines (e.g., haul trucks), transport machines, fluid/water delivery vehicles, multi-functional machines (e.g., wheel tractor scrapers), and other types of mobile machines. The types of mobile machines may be the same (some or all) or different (some or all). According to one or more embodiments of the disclosed subject matter, the context, that is, the type or worksite 10, may be different from the one shown in FIG. 1.

Machines 12b may follow a travel path 18 that generally extends between load and dump locations 14, 16. One or more other mobile dozing or grading machines 12c at worksite 10 may be tasked with clearing or leveling load location 14, dump location 16, and/or travel path 18 such that travel by other machines 12 at these locations may be possible. As machines 12 operate at worksite 10, the shapes, dimensions, and general positions of load location 14, dump location 16, and travel path 18 may change.

Figure 2:
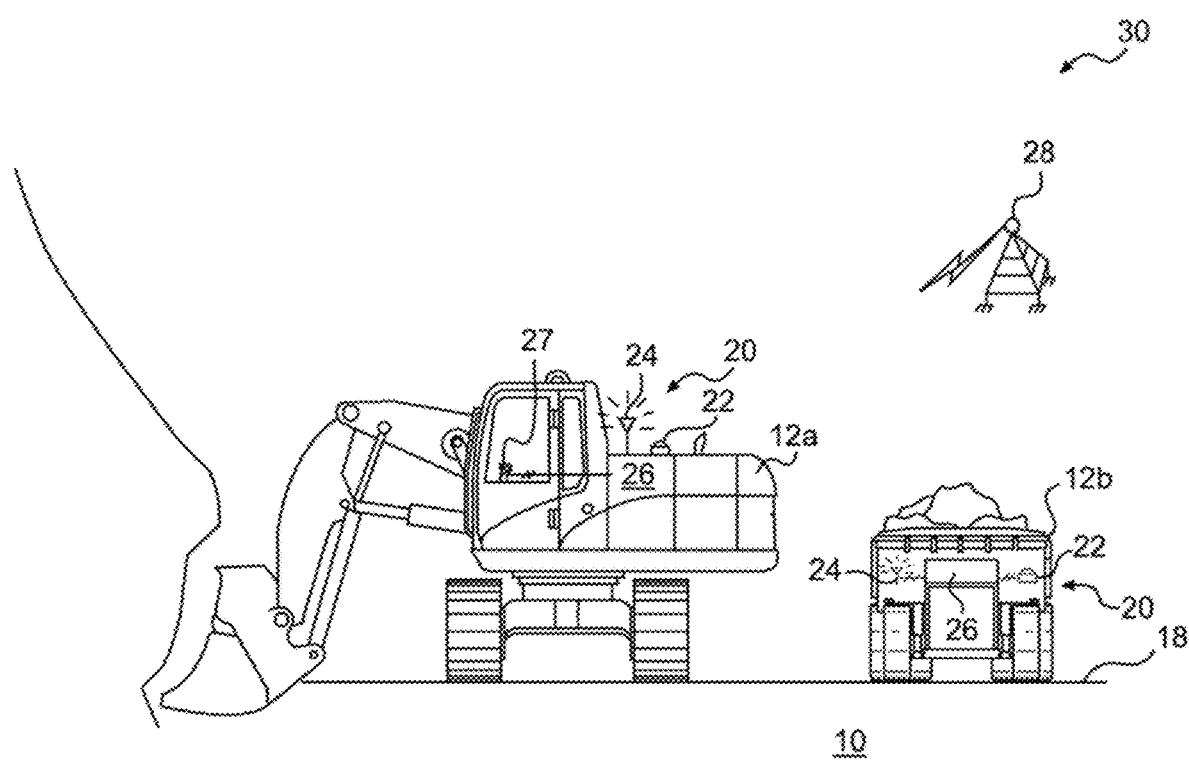
FIG. 2 shows an illustration of a portion of a control system at the worksite of FIG. 1.

As shown in FIG. 2, each machine 12 may be equipped with a control module 20 that facilitates or enhances autonomous and/or human control of machine 12. Control module 20 may include, among other things, a locating device 22 (which may also be referred to or characterized as a position sensing system), a communicating device 24, and an onboard controller 26, which may be implemented in or using circuitry, connected to locating device 22 and communicating device 24. When intended for use with a manually operated machine 12, control module 20 may also include one or more operator interface devices 27. Operator interface devices 27 may include, for example, an input device such as a joystick, keyboard, steering wheel, pedal, lever, button, switch, etc. Alternatively or additionally, operator interface devices 27 may include a display device such as a monitor, if desired.

Locating device 22 may be configured to determine a position of machine 12 and generate a signal indicative thereof. Locating device 22 could embody, for example, a Global Positioning System (GPS) device, an Inertial Reference Unit (IRU), a local tracking system, or any other known locating device that receives or determines positional information associated with machine 12. Locating device 22 may be configured to convey a signal indicative of the received or determined positional information to onboard controller 26 for processing. It is contemplated that the location signal may also be directed to one or more of interface devices 27 (e.g., to the monitor) for display of machine location in an electronic representation of worksite 10, if desired.

Communicating device 24 may include hardware and/or software (including circuitry) that enables sending and receiving of data messages between onboard controller 26 and an offboard worksite controller (OWC) 28. The offboard worksite controller 28, together with each control module 20 of machines 12, may embody a control system 30. The data messages associated with control system 30 may be sent and received via a direct data link and/or a wireless communication link, as desired. The direct data link may include an Ethernet connection, a connected area network (CAN), or another data link. The wireless communications may include satellite, cellular, infrared, and any other type of wireless communications that enable communications device 24 to exchange information between onboard controller 28 and the components of control module 20.

Figure 3:
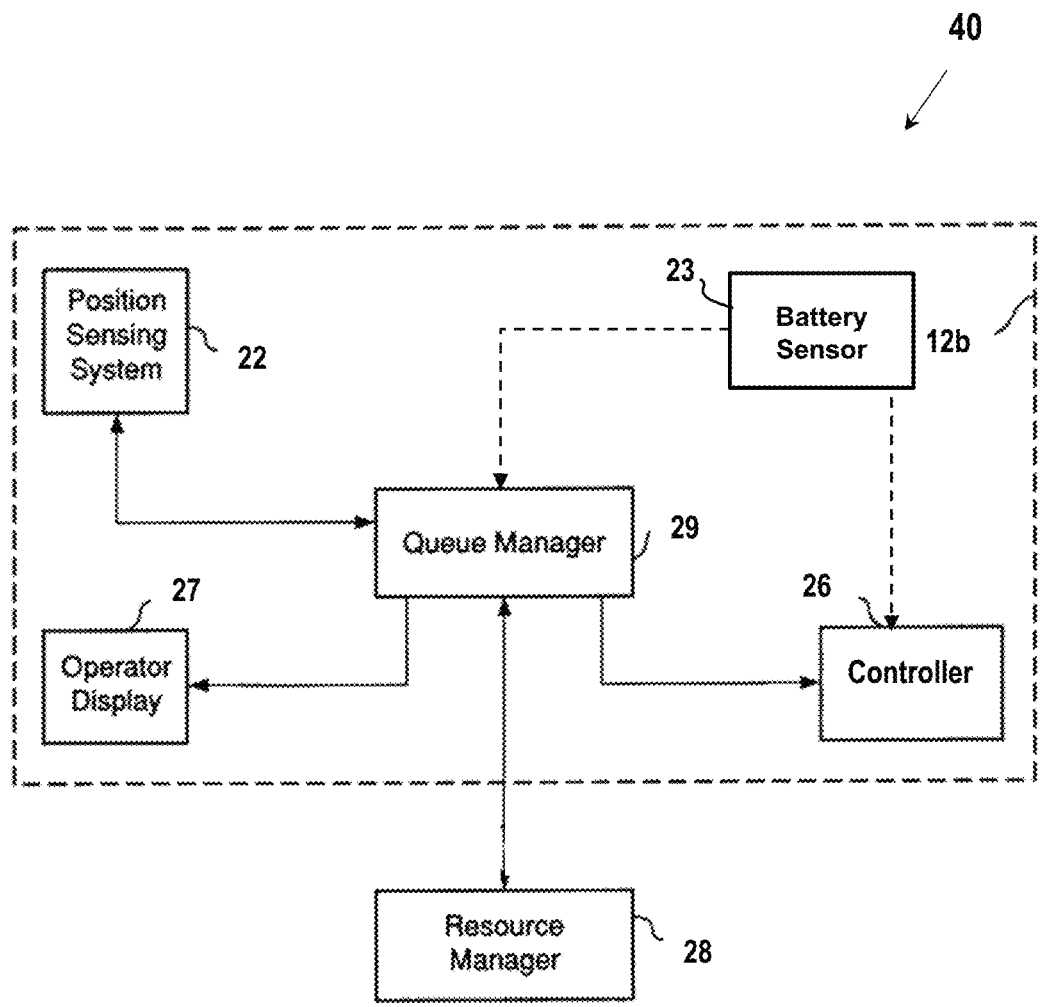
FIG. 3 is a block diagram of a system according to one or more embodiments of the disclosed subject matter.

With reference to FIG. 3, FIG. 3 shows a system 40 according to one or more embodiments of the disclosed subject matter. The system 40 may be referred to or characterized as a system for queue management. In this example, the queue can be formed of one or more mobile machines 12b, to arrive at a predetermined location at the worksite 10, whether the load location 14 or the dump location 16 of the worksite 10. Here, offboard worksite controller 28 may be referred to or characterized as a resource manager 28. Also shown in FIG. 3, the mobile machine 12b can have a controller in the form of a queue manager 29, which may be implemented in or using circuitry. Thus, all of the mobile machines 12b can have their own queue manager 29, according to one or more embodiments of the disclosed subject matter, and the resource manager 28 can communicate with each of the queue managers 29 via wireless communication using the communicating device 24. Optionally, the queue manager 29 may be part of the controller 26 or vice versa. Alternatively, the queue manager 29 may be offboard the mobile machine 12b, for instance, as part of the resource manager 28. Thus, the circuitry (including processing circuitry) of the queue manager 29 may be offboard or remote from the mobile machine 12b.

Generally, the queue manager 29, whether part of the mobile machine 12b or the offboard worksite controller 28, can control positioning of the mobile machine 12b relative to a queue of one or more additional mobile machines 12b (which may be the same or different type) to arrive at a predetermined location at the worksite 10 (e.g., either the load location 14 or the dump location 16). The queue of mobile machines 12b may be on one or more of the travel paths 18.

Generally, the queue manger 29 can determine where in the queue the mobile machine 12b should be positioned. Here, the queue of one or more other mobile machines 12b can already have been established. Furthermore, the mobile machine 12b for which the queue position determination is to be made can be outside of the queue but wishing or otherwise being required to join the queue. Alternatively, the mobile machine 12b for which the queue position determination is to be made can already be in the queue and the determination can be with respect to repositioning of the mobile machine 12b within the queue (e.g., advancing or moving up in the queue).

The queue manager 29 can determine where (i.e., a position or location) in the queue to provide (e.g., initial placement or reposition) the mobile machine 12b such that the mobile machine 12b is able to reach the predetermined location at the end of the queue, optionally perform a task at the predetermined location (e.g., dumping or being filled), and then reach another predetermined location at the worksite 10 for another task (the mobile machine 12b performs or is performed to the mobile machine 12b). As an example, the another predetermined location can be a refueling (e.g., recharging) site for the mobile machine 12b to be refueled (e.g., recharged).

Notably, the determination can be based on predicted or estimated amount of energy left in an energy source of the mobile machine 12b upon reaching the predetermined location at the end of the queue after arriving at the predetermined location via the queue. Examples of an energy source of the mobile machine 12b include one or more batteries and/or one or more fuel cells. Hence, the queue manager 29, according to one or more embodiments, can determine where in the queue the mobile machine 12b can be placed, based on the estimated amount of remaining energy, such that the mobile machine 12b can traverse the queue, perform a task at the predetermined location at the end of the queue, and still make it to the other predetermined location to perform another task. Optionally, at least according to some embodiments, the determination can be based on where the mobile machine 12b can be placed in the queue such that the mobile machine 12b has enough energy to traverse the queue and perform the task at the predetermined location at the end of the queue. The queue of mobile machines 12b can be on one or more portions of the travel path 18.

The determination can include receiving remaining energy data from a sensor 23 of the mobile machine 12b. That is, the queue manager 29 (and optionally the controller 26) can receive remaining energy data from the sensor 23. According to one or more embodiments, the sensor 23 can be a battery sensor. Hence, the energy data can be battery data, which can include a state of charge (SOC) of the battery (or batteries). The battery data can be current (e.g., real time) battery data from the battery of the mobile machine 12b. Energy data from the sensor 23 can be output continuously or periodically from the sensor 23.

The current state of charge data can be indicative of the amount of remaining energy for the battery at the current location of the mobile machine 12b. Rather than state of charge (SOC), one or more embodiments may instead implement depth of discharge (DOD) data. As noted above, the current location of the mobile machine 12b can be in the queue or outside of the queue. According to one or more embodiments, data from the locating system 22 can be associated with the current energy data (e.g., current state of charge data).

The queue manager 29 can determine an estimated amount of energy depletion of the energy source of the mobile machine 12b for the mobile machine to travel from the current location and arrive at the predetermined location at the end of the queue. In some cases, this may include determining multiple estimations for different positions for the mobile machine 12b within the queue. The estimated amount of energy depletion can, according to one or more embodiments, be or include estimated charge loss of the battery (or batteries).

The queue manager 29 can determine the estimated amount of energy depletion (e.g., charge loss) based on the current remaining energy (e.g., state of charge of the battery) at the current location of the mobile machine 12b, a predetermined route for the mobile machine 12b to travel to the predetermined location at the end of the queue (e.g., from the current location of the mobile machine 12b), an estimated time for the mobile machine 12b to travel to the predetermined location at the end of the queue (e.g., from the current location of the mobile machine 12b), and/or a position of the mobile machine 12b in the queue relative to one or more additional mobile machines (e.g. mobile machines 12 in front of the mobile machine 12b). Optionally, the estimated amount of energy depletion may be based on completion of a task at the predetermined location (e.g., loading).

Based on the estimated amount of energy depletion, the queue manager 29 can determine an estimated amount of remaining energy when the mobile machine 12b arrives at the predetermined location at the end of the queue. Optionally, the estimated amount of remaining energy may be based on completion of a task at the predetermined location (e.g., loading).

The queue manager 29 can compare the estimated future amount of energy of the energy source upon arrival of the mobile machine 12b at the predetermined location to a required amount of energy of the energy source to complete a predetermined task after the mobile machine 12b arrives at the predetermined location. Here, the predetermined task can be at the predetermined location (e.g., loading or dumping) or the predetermined task can be at a predetermined location different from the predetermined location at the end of the queue. For instance, the predetermined task can be a refueling task (e.g., recharging) at a refueling station (e.g., charging station). As another example, the predetermined task can be a dumping operation at the dump location 16 after a loading operation performed at the loading location 14, where the loading location 14 is at the end of the queue.

The queue manager 29, for instance, in conjunction with the resource manager 28, can provide the mobile machine 12b in the queue. In particular, such providing can be such that the estimated future amount of energy (e.g., state of charge) is at or above a required amount of energy to complete the predetermined task after the mobile machine 12b arrives at the predetermined location of the worksite 10. The queue manager 29 can output control signaling to cause the mobile machine 12b to move into the appropriate position in the queue (e.g., autonomously). Alternatively, the queue manager 29 can output instructions on a display device (e.g., of the operator interface device 27) with instructions to the operator where to position the mobile machine 12b in the queue.

Figure 4A:
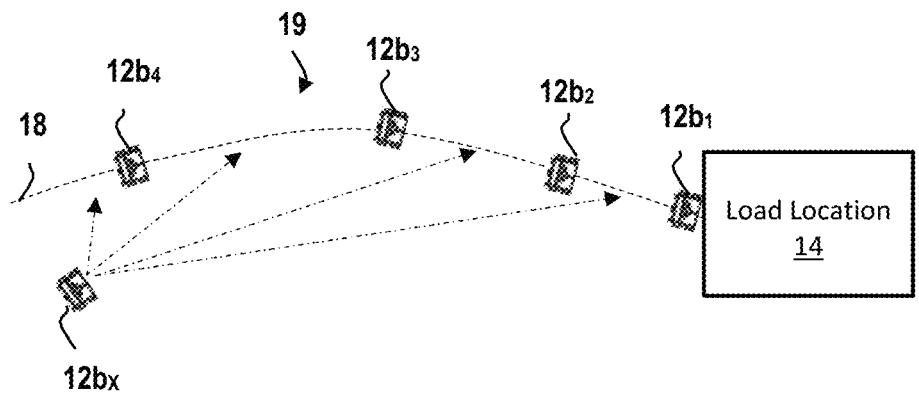
FIG. 4A is a block diagram showing exemplary mobile machine queue management according to one or more embodiments of the disclosed subject matter.

Referring to FIG. 4A, according to one or more embodiments, the mobile machine 12b ($12b_x$ in this figure) can be initially outside of the queue 19. The queue manager 29 can provide the mobile machine $12b_x$ to the queue 19 such that the estimated energy loss of the energy source of the mobile machine $12b_x$ is at or above a required amount of energy to complete a predetermined task after the mobile machine $12b_x$ arrives at the load location 14. As examples, the predetermined task can be at a location of the worksite 10 different from the load location 14, for instance, at a location to recharge the mobile machine $12b_x$ or at the dump location 16. Thus, FIG. 4A provides an example of moving the mobile machine $12b_x$ from outside the queue 19 to an initial placement in the queue 19.

According to one or more embodiments, the mobile machine $12b_x$ can be placed as far back as back possible in the queue 19 so as to still satisfy the estimated energy loss of the energy source of the mobile machine $12b_x$ being at or above a required amount of energy to complete a predetermined task after the mobile machine $12b_x$ arrives at the load location 14. For instance, if the queue manager 29 determines that between mobile machine $12b_1$ and $12b_2$ and between $12b_2$ and $12b_3$ will both satisfy the requirement, the queue manager 29 can control or instruct the mobile machine $12b_x$ to be provided in the queue 19 between $12b_2$ and $12b_3$.

Figure 4B:
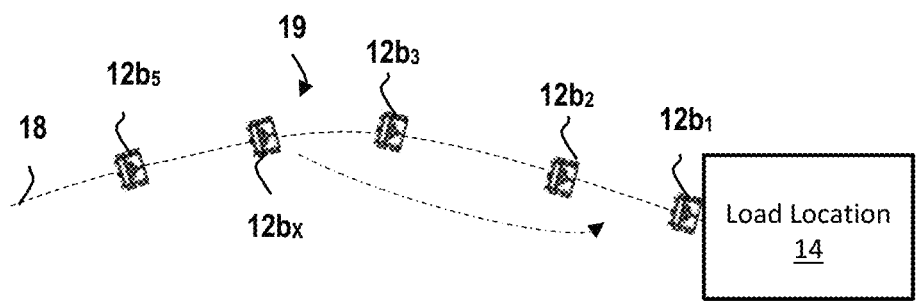
FIG. 4B is a block diagram showing exemplary mobile machine queue management according to one or more embodiments of the disclosed subject matter.

Referring to FIG. 4B, according to one or more embodiments, the mobile machine 12b ($12b_x$ in this figure) can be in the queue 19. The queue manager 29 can provide the mobile machine $12b_x$ to the queue 19 such that the estimated energy loss of the energy source of the mobile machine $12b_x$ is at or above a required amount of energy to complete a predetermined task after the mobile machine $12b_x$ arrives at the load location 14. Here, providing the mobile machine $12b_x$ to the queue 19 can mean changing position (i.e., order) of the mobile machine $12b_x$ within the queue 19, for instance, advancing or moving up the mobile machine $12b_x$ in the queue 19. For instance, when queue manager 29 determines that the estimated energy loss of the energy source of the mobile machine $12b_x$ is not at or above the required amount of energy to complete the predetermined task after the mobile machine $12b_x$ arrives at the load location 14, the queue manager 29 can move up or advance the mobile machine $12b_x$ in the queue 19 until the condition is satisfied. Such advancing may advance the mobile machine $12b_x$ ahead of one or more other mobile machines in the queue 19, such as shown in FIG. 4B. In a case where the mobile machine $12b_x$ is at a position in the queue 19 where the condition is satisfied, the queue manager 29 can control (or output instructions) the mobile machine $12b_x$ to maintain its current order in the queue 19.

Whether the situation in FIG. 4A or the situation in FIG. 4B, according to one or more embodiments of the disclosed subject matter, the order of one or more (e.g., two) other mobile machines 12b may change based on where the mobile machine $12b_x$ is provided in the queue 19 or exclusive of where the mobile machine $12b_x$ is provided in the queue 19. In some instances, the mobile machine $12b_x$ may move back in the queue 19, for instance, depending upon circumstances of the other mobile machines 12b in the queue 19 or another mobile machine 12b entering the queue 19.

INDUSTRIAL APPLICABILITY

As noted above, embodiments of the present disclosure relate to methods and systems for managing machines, and more particularly to systems and methods for queue management of machines based on battery-related characteristics. Some or all of the battery-operated machines may be battery electric machines or vehicles (i.e., all-electric machines/all-electric vehicles).

In general, according to embodiments of the disclosed subject matter, a queue management system and method for mobile machine (e.g., a battery electric vehicle (BEV)) based on energy state (e.g., a state of charge (SOC) of the BEV) is disclosed. The system and method can calculate energy loss (e.g., charge loss) based on different machine parameters, such as current SOC, planned route or task, queue position, and/or wait time. Further, based on the calculated energy loss (e.g., charge loss), and assigned route or task, the system can compare the remaining SOC with a required or an optimal SOC. Based on the comparison of the remaining SOC, the system and method can prioritize or change a position of the mobile machine in the queue. For haulage vehicles, this can occur at dump and load locations, for instance, where idle time may impact the ability for machines to complete additional tasks, which can lead to decreased productivity.

The system and method can use sensors onboard the mobile machine to monitor, for instance, battery SOC (or for a fuel cell vehicle combined with fuel depletion) and can determine subsequent tasks through a site level route planner, such as the resource manager 28. The system and method can calculate for each potential route, and locations of recharge stations, for instance, expected battery usage for subsequent tasks, and ensure that the mobile machine(s) is/are capable of completing tasks and returning to charge stations (with attendant wait times). The system and method can then prioritize machines in queue to achieve task plans. Other priorities beyond that may be maintaining optimal or threshold SOC to achieve optimal power usage and or improve battery life, efficiency of the vehicle (size and capacity) versus other machines, quality or type of material hauled, and other considerations should be considered as additional parameters.

Figure 5:
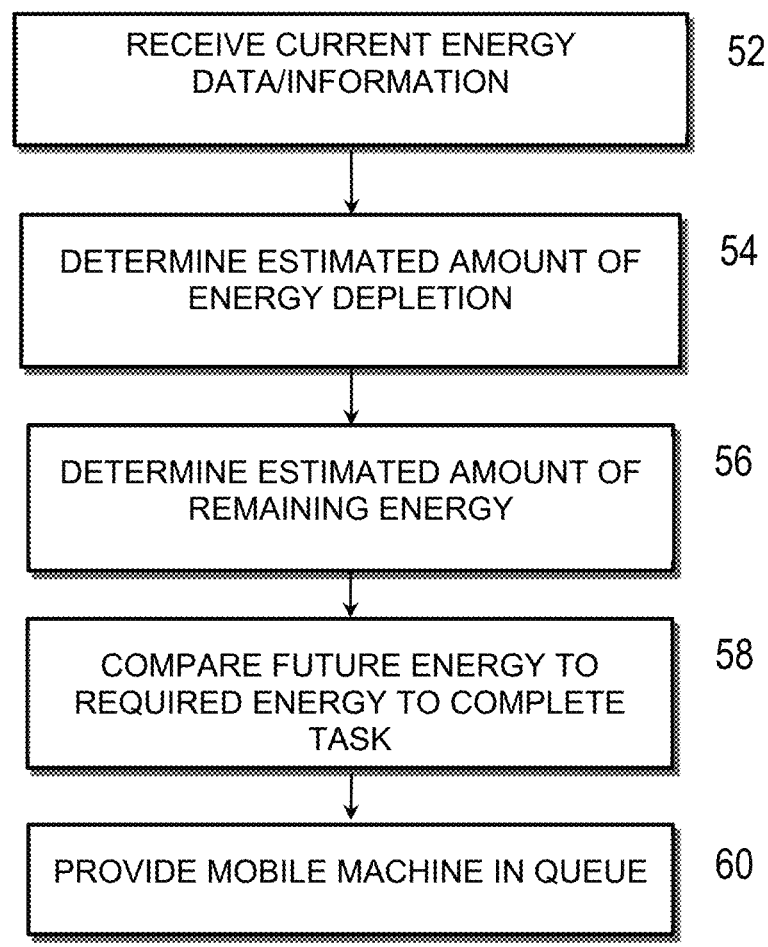
FIG. 5 is a flow chart of a method according to one or more embodiments of the disclosed subject matter.

FIG. 5 is a flow chart of a method 50 according to embodiments of the disclosed subject matter. Some or all of the method 50 can be performed via a non-transitory computer-readable storage medium (or media) having stored thereon instructions that, when executed by one or more processors, such as processor(s) 29, 28, causes the one or more processors to perform some or all of the method 50. According to one or more embodiments, the method 50 may be referred to or characterized as a method for managing a plurality of battery electric vehicles (BEVs) and/or a method for queue management of mobile machines at a worksite.

At 52 the method 50 can include receiving remaining energy data from a sensor 23 of the mobile machine 12b. For instance, the queue manager 29 (and optionally the controller 26) can receive remaining energy data from the sensor 23. According to one or more embodiments, the sensor 23 can be a battery sensor. Hence, the energy data can be battery data, which can include a state of charge (SOC) of the battery (or batteries). The battery data can be current (e.g., real time) battery data from the battery of the mobile machine 12b.

At 54 the method 50 can include determining an estimated amount of energy depletion of the energy source of the mobile machine 12b for the mobile machine to travel from the current location and arrive at the predetermined location at the end of the queue 19. In some cases, this may include determining multiple estimations for different positions for the mobile machine 12b within the queue 19. The estimated amount of energy depletion can, according to one or more embodiments, be or include estimated charge loss of the battery (or batteries).

The queue manager 29, for instance, can determine the estimated amount of energy depletion (e.g., charge loss) based on the current remaining energy (e.g., state of charge of the battery) at the current location of the mobile machine 12b, a predetermined route for the mobile machine 12b to travel to the predetermined location at the end of the queue 19 (e.g., from the current location of the mobile machine 12b), an estimated time for the mobile machine 12b to travel to the predetermined location at the end of the queue 19 (e.g., from the current location of the mobile machine 12b), and/or a position of the mobile machine 12b in the queue 19 relative to one or more additional mobile machines (e.g. mobile machines 12 in front of the mobile machine 12b) and/or the tasks to be performed by the one or more additional mobile machines at the predetermined location. Optionally, the estimated amount of energy depletion may be based on completion of a task at the predetermined location (e.g., loading).

At 56 the method 50 can include can determining an estimated amount of remaining energy when the mobile machine 12b arrives at the predetermined location at the end of the queue 19. Such determination can be based on the estimated amount of energy depletion at 54. Optionally, the estimated amount of remaining energy may be based on completion of a task at the predetermined location (e.g., loading).

At 58 the method 50 can include comparing the estimated future amount of energy of the energy source upon arrival of the mobile machine 12b at the predetermined location to a required amount of energy of the energy source to complete a predetermined task after the mobile machine 12b arrives at the predetermined location at the end of the queue 19. Here, the predetermined task can be at the predetermined location (e.g., loading or dumping) or the predetermined task can be at a predetermined location different from the predetermined location at the end of the queue 19. For instance, the predetermined task can be a refueling task (e.g., recharging) at a refueling station (e.g., charging station). As another example, the predetermined task can be a dumping operation at the dump location 16 after a loading operation performed at the loading location 14, where the loading location 14 is at the end of the queue 19.

At 60 the method 50 can including providing the mobile machine 12b to the queue 19. Such providing can be such that the estimated future amount of energy (e.g., state of charge) is at or above a required amount of energy to complete the predetermined task after the mobile machine 12b arrives at the predetermined location of the worksite 10. The queue manager 29 can output control signaling to cause the mobile machine 12b to move into the appropriate position in the queue (e.g., autonomously). Alternatively, the queue manager 29 can output instructions on a display device (e.g., of the operator interface device 27) with instructions to the operator where to position the mobile machine 12b in the queue.

As noted above, referring again to FIG. 4A, according to one or more embodiments, the mobile machine 12b ($12b_x$ in this figure) can be initially outside of the queue 19 for operations 52-58 of the method 50. The queue manager 29 can provide the mobile machine $12b_x$ to the queue 19 at operation 60 such that the estimated energy loss of the energy source of the mobile machine $12b_x$ is at or above a required amount of energy to complete a predetermined task after the mobile machine $12b_x$ arrives at the load location 14. As examples, the predetermined task can be at a location of the worksite 10 different from the load location 14, for instance, at a location to recharge the mobile machine $12b_x$ or at the dump location 16. Thus, FIG. 4A provides an example of moving the mobile machine $12b_x$ from outside the queue 19 to an initial placement in the queue 19.

Referring again to FIG. 4B, according to one or more embodiments, the mobile machine 12b ($12b_x$ in this figure) can be in the queue 19 for operations 52-60. The queue manager 29 can provide the mobile machine $12b_x$ to the queue 19 such that the estimated energy loss of the energy source of the mobile machine $12b_x$ is at or above a required amount of energy to complete a predetermined task after the mobile machine $12b_x$ arrives at the load location 14. Here, providing the mobile machine $12b_x$ to the queue 19 can mean changing position (i.e., order) of the mobile machine $12b_x$ within the queue 19, for instance, advancing or moving up the mobile machine $12b_x$ in the queue 19. For instance, when queue manager 29 determines that the estimated energy loss of the energy source of the mobile machine $12b_x$ is not at or above the required amount of energy to complete the predetermined task after the mobile machine $12b_x$ arrives at the load location 14, the queue manager 29 can move up or advance the mobile machine $12b_x$ in the queue 19 until the condition is satisfied. Such advancing may advance the mobile machine $12b_x$ ahead of one or more other mobile machines in the queue 19, such as shown in FIG. 4B. In a case where the mobile machine $12b_x$ is at a position in the queue 19 where the condition is satisfied, the queue manager 29 can control (or output instructions) the mobile machine $12b_x$ to maintain its current order in the queue 19.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A system for managing a plurality of battery electric vehicles (BEVs) at a worksite comprising:
    circuitry to receive battery data sensed by respective battery sensors onboard the battery electric vehicles, the battery data including a current state of charge (SOC) of a battery of each of the battery electric vehicles; and
    processing circuitry operatively coupled to the circuitry to receive the battery data from the circuitry and configured to
        calculate estimated charge loss of the battery of one of the battery electric vehicles for said one battery electric vehicle to arrive at a predetermined location of the worksite at an end of a queue of the battery electric vehicles comprised of said one battery electric vehicle and one or more additional battery electric vehicles of the plurality of battery electric vehicles,
            wherein the calculation of the estimated charge loss is based on (i) the current state of charge (SOC) of the battery of said one battery electric vehicle in the battery data received by the circuitry, (ii) a planned route for said one battery electric vehicle to travel to the predetermined location at the end of the queue, and (iii) estimated time for said one battery electric vehicle to travel to the predetermined location via the queue, and
        responsive to the calculation of the estimated charge loss, control said one battery electric vehicle in the queue such that an estimated future state of charge (SOC) of the battery of said one battery electric vehicle, which is calculated based on the estimated charge loss of the battery, is at or above a required state of charge (SOC) to complete a predetermined task that is to be completed after said one battery electric vehicle has arrived at the predetermined location of the worksite,
    wherein the predetermined task is a work task to be performed by said one battery electric vehicle at the worksite after said one battery electric vehicle has arrived at the predetermined location of the worksite,
    wherein the predetermined location of the worksite excludes a charging station for the battery electric vehicles,
    wherein said one battery electric vehicle is controllable by the processing circuitry to perform the work task at the predetermined location and preform a second work task at a second predetermined location at the worksite without recharging between the control of said one battery electric vehicle in the queue and completion of the work tasks, and
    wherein the control of said one battery electric vehicle in the queue includes:
        calculating the estimated future state of charge (SOC), and
        comparing the estimated future state of charge (SOC) with the required state of charge (SOC) to complete the work task after said one battery electric vehicle has arrived at the predetermined location of the worksite.

2. The system according to claim 1, wherein the predetermined task is completed at the predetermined location at the end of the queue.

3. The system according to claim 1, wherein the predetermined task is completed at a second predetermined location different from said predetermined location at the end of the queue.

4. The system according to claim 1, wherein the controlling said one battery electric vehicle in the queue includes advancing said one battery electric vehicle ahead of at least one of the one or more additional battery electric vehicles in the queue.

5. The system according to claim 1, wherein the controlling said one battery electric vehicle in the queue includes moving said one battery electric vehicle from outside the queue to an initial placement in the queue.

6. The system according to claim 1, wherein the controlling said one battery electric vehicle in the queue includes switching order in the queue of two other battery electric vehicles already in the queue.

7. The system according to claim 1, wherein the circuitry and the processing circuitry are different from the plurality of battery electric vehicles.

8. A method comprising:
    determining, using an electronic processor, an estimated amount of energy depletion of an energy source of a mobile machine at a worksite in order for the mobile machine to travel from a current location of the worksite and arrive at a predetermined location of the worksite at an end of a queue of a plurality of the mobile machines including said mobile machine and one or more additional mobile machines, said determining the estimated amount of energy depletion of the energy source being based on a current energy amount of the energy source at the current location, a predetermined route for said mobile machine to travel from the current location to the predetermined location at the end of the queue, a position of said mobile machine in the queue relative to the one or more additional mobile machines, and an estimated time for said mobile machine to travel from the current location of the worksite to the predetermined location of the worksite;
    comparing, using the electronic processor, an estimated future amount of energy of the energy source upon arrival of said mobile machine at the predetermined location, which is determined based on the estimated amount of energy depletion of the energy source, to a required amount of energy of the energy source to complete a predetermined task after said mobile machine arrives at the predetermined location of the worksite; and
    moving up in the queue, using the electronic processor, said mobile machine under a condition where the estimated future amount of energy of the energy source is less than the required amount of energy of the energy source to complete the predetermined task, such that the estimated future amount of energy of the energy source is at or above the required amount of energy of the energy source to complete the predetermined task, wherein the predetermined task is a work task to be performed by said mobile machine at the worksite after said mobile machine arrives at the predetermined location of the worksite, wherein the predetermined location of the worksite excludes a charging station for the mobile machines, wherein said mobile machine is to perform the work task at the predetermined location and preform a second work task at a second predetermined location at the worksite without recharging between said moving up in the queue and performance of the work tasks, wherein said moving up in the queue said mobile machine includes comparing the estimated future amount of energy of the energy source with the required amount of energy of the energy source to complete the predetermined task after said mobile machine arrives at the predetermined location of the worksite, and wherein the method further comprises receiving state of charge data from a battery sensor of said mobile machine indicative of the current energy amount of the energy source at the current location.

9. The method according to The method according to wherein said mobile machine is a battery electric machine, wherein the energy source is one or more batteries of the battery electric machine, and wherein the estimated future amount of energy is an estimated future state of charge (SOC) of the one or more batteries and the required amount of energy is a required state of charge to complete the predetermined task.

10. The method according to claim 8, further comprising maintaining position or moving back in the queue said mobile machine under a second condition where the estimated future amount of energy of the energy source is at or above the required amount of energy of the energy source to complete the predetermined task.

11. The method according to claim 8, wherein said moving up in the queue said mobile machine includes switching order between multiple ones of said additional mobile machines in the queue.

12. A non-transitory computer-readable storage medium having stored thereon instructions that, when executed by one or more processors, causes the one or more processors to perform a method comprising:

determining estimated charge loss of a battery of one of a plurality of battery electric machines for the one battery electric machine move from a current location of the worksite to arrive at a predetermined location of the worksite at an end of a queue of the battery electric machines comprised of the one battery electric machine and additional battery electric machines, the calculation of the estimated charge loss for the one battery electric machine to arrive at the predetermined location of the worksite being based on the current state of charge (SOC) of the battery of the one battery electric machine and estimated time for the one battery electric machine to move to the predetermined location via the queue, and outputting control signaling to position the one battery electric machine in the queue such that an estimated future state of charge, which is calculated based on the estimated charge loss of the battery, is at or above a required state of charge (SOC) to complete a predetermined task after the one battery electric machine arrives at the predetermined location of the worksite, wherein the predetermined task is a work task to be performed by the one battery electric machine at the worksite after the one battery electric machine arrives at the predetermined location of the worksite, wherein the predetermined location of the worksite excludes a charging station for the battery electric machines, wherein the one battery electric machine is controllable to perform the work task at the predetermined location and preform a second work task at a second predetermined location at the worksite without recharging between the positioning of the one battery electric machine in the queue and completion of the work tasks, wherein said outputting control signaling to position the one battery electric machine in the queue includes comparing the estimated charge loss for the one battery electric machine to arrive at the predetermined location of the worksite with the required state of charge (SOC) to complete a predetermined task after the one battery electric machine arrives at the predetermined location of the worksite, and wherein the method further comprises receiving state of charge data from a battery sensor of the one battery electric machine indicative of the current state of charge of the battery at the predetermined location of the worksite.

13. The non-transitory computer-readable storage medium according to claim 12, wherein the predetermined task is completed at a second predetermined location different from said predetermined location at the end of the queue.

14. The non-transitory computer-readable storage medium according to claim 12, wherein the method further comprises positioning the one battery electric machine in the queue based on said outputting the control signaling, and wherein said positioning the one battery electric machine in the queue includes advancing the one battery electric machine ahead of at least one of the additional battery electric machines in the queue.

15. The non-transitory computer-readable storage medium according to claim 12, wherein the method further comprises positioning the one battery electric machine in the queue based on said outputting the control signaling, and wherein said positioning the one battery electric machine in the queue includes moving the one battery electric machine from outside the queue to an initial position in the queue.

16. The non-transitory computer-readable storage medium according to claim 12, wherein the method further comprises positioning the one battery electric machine in the queue based on said outputting the control signaling, and wherein said positioning the one battery electric machine in the queue includes switching order in the queue of at least two other battery electric machines already in the queue.

* * * * *